July 8, 1947.	E. A. STALKER	2,423,803
HIGH LIFT DEVICE
Filed Dec. 8, 1943
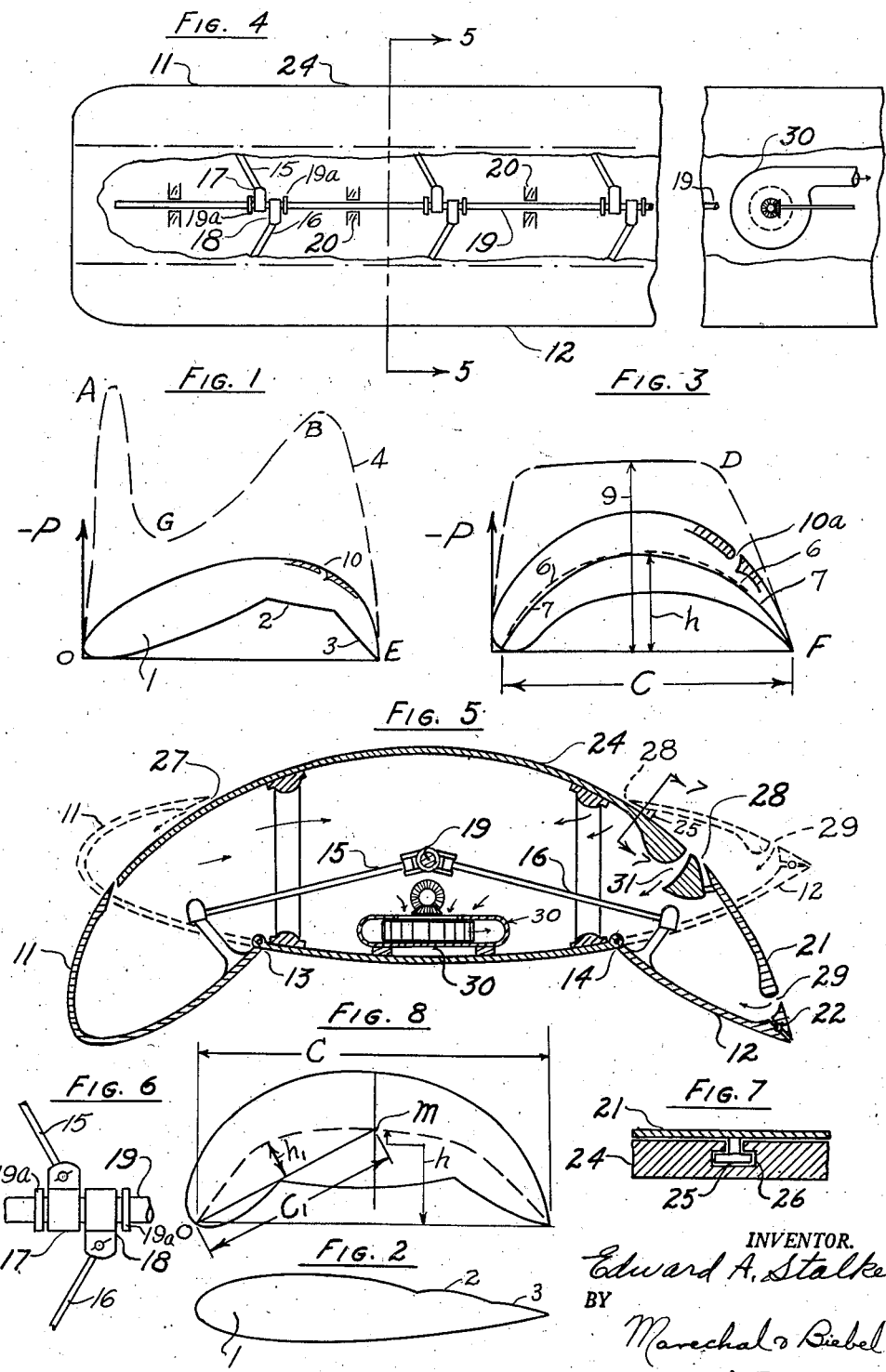
INVENTOR.
Edward A. Stalker
BY
Marechal & Biebel
ATTORNEYS Patented July 8, 1947

2,423,803

UNITED STATES PATENT OFFICE 2,423,803

HIGH LIFT DEVICE

Edward A. Stalker, Bay City, Mich.

Application December 8, 1943, Serial No. 513,344

15 Claims. (Cl. 244—42)

My invention relates to aircraft and more particularly to wings.

It has for its principal objects, to provide a wing capable of developing a high maximum lift coefficient with a substantially uniform pressure distribution over its upper surface favorable to the control of the boundary layer thereon in an economical manner and with the expenditure of a minimum amount of power.

It is a further object to provide such a wing which is adjustable from the high lift condition to a high speed position in which it has desirable characteristics of low drag.

Other objects and advantages will be apparent from the following description, the accompanying drawing and the appended claims.

Referring to the drawing—

Figs. 1 and 2 are diagrammatic views of a wing section in its high lift and high speed positions, respectively;

Fig. 3 is a similar view of a wing section in accordance with the present invention;

Fig. 4 is a fragmentary top plan view of the wing of this invention;

Fig. 5 is a section along the line 5—5 of Fig. 4;

Fig. 6 is a fragmentary view of a part of the flap adjusting mechanism;

Fig. 7 is a fragmentary section along the line 7—7 of Fig. 4; and

Fig. 8 is a diagrammatic view pertaining to the airfoil geometry.

In Figs. 1 and 2 there is shown a wing section 1 with two tandem arranged flaps 2 and 3 which are depressible to form a highly arched wing section. The pressure distribution over the upper surface of the highly arched wing with the flaps depressed is shown by the broken curve 4 of Fig. 1, negative pressure—P, being represented as ordinates. It will be noted that at B the suction is almost equal to the high suction over the nose at A. This means that the slope or gradient of the pressure curve from B to E at the trailing edge of the wing is very steep. A curve which proceeds from a high suction pressure to a lower one is said to have an adverse pressure gradient and the steepness of the curve where the gradient is adverse is a major factor in determining whether or not the flow will separate from the wing surface.

Fig. 3 shows a wing section 5 in accordance with this invention. The wing has a high value of the mean camber line 6 and a special distribution of the wing thickness along the wing chord C. The mean camber line has the maximum ordinate $h$ at about the midpoint of the chord and the thickness of the wing increases progressively from the nose to the middle of the chord. The mean camber line 6 preferably has a form which lies above a circular arc 7 through the midpoint and the leading and trailing points of the mean camber line. However as a practical matter some departures are permissible from the curve 6 and curve 7 is also beneficial.

With the wing section shown in Fig. 3 the pressure distribution over the upper surface is maintained at a relatively high and substantially uniform value over a major portion of the chord. Hence the wing has a greater lift than the section of Fig. 1 and yet the slope of the aft portion of the curve is less adverse than the corresponding slope in Fig. 1. In other words the adverse pressure gradient of the curve portion DF is less adverse than the curve portion BE of Fig. 1, and there is no intermediate section having an adverse pressure gradient. This means that for pressure gradients too adverse for the wind to follow the surface unaided, the relative wind may be maintained in contact with the wing in the aft portion thereof with a smaller suction through a slot 10a than is necessary through a slot 10 of the wing of Fig. 1.

The wing section of Fig. 3 is not suitable for airplanes because of the highly arched under surface and because in particular the down-tilting nose would cause too high a drag. Figs. 4 and 5, however, show a means of converting the wing section to a low drag or high speed section while retaining essentially the above characteristics in its high lift position. The main features of the mean camber line of Fig. 3 are retained as well as the thickness distribution along the chord. However the shape of the lower surface is determined to have a substantially convex portion along the middle section so that when the leading and trailing edge flaps 11 and 12 are raised the under surface is smooth and convex.

The front and rear flaps are hinged at 13 and 14 respectively to the lower part of the main body section, and are moved by the links 15 and 16 respectively. These links are articulated at their outer ends to their respective flaps while at their inner ends they are articulated to sleeves 17 and 18 respectively. These sleeves are free to rotate on the push rod 19 but are restrained from sliding along the rod by means of pairs of collars 19a fixed to the rod. The rod itself is borne in bearings 20 to guide and support it while it is being slid spanwise. It will be clear that spanwise motion of the rod 19 will raise or lower the flaps in coordination.

As the rear flap 12 is rotated about its hinge 14 the upper wall 21 thereof is rotated about the hinge 22 near the trailing edge so that the forward edge of the upper wall can remain in a preassigned relation to the upper wall of the main body 24 of the wing and follow the upper wall throughout its adjusting movement. As shown in Figs. 5 and 7 the upper wall 21 of the flap is connected at its forward edge to wall 24 by the T-lugs 25 sliding in the slots 26 in wall 24, a plurality of these lugs and slots being distributed along the span.

When the flaps are up, that is in the low drag position shown in dotted lines in Fig. 5, the upper surface has concavities therein at the junction points of the flaps with the main body section, which are beneficial in reducing the drag of the wing section. This reduction is further increased by the presence of the slots 27, 28 and 29 formed between the upper flap walls and the upper wall of the wing. The boundary layer is inducted through these slots by the blower 30, the suction side of which is in communication with the slots and which discharges at some convenient slot or opening or to the lower plant, not shown.

It is important that the front slot be located substantially at the junction of the upper surface of the nose flap and the surface of the main body when the flap is raised so as to be suitable for high speed flight. The depression in the upper surface is satisfactory for high speed flight since the boundary layer is withdrawn therethrough by power means, depressions or openings not served by such power means causing serious drag at high speeds.

When the flaps are down the flap 21 uncovers the additional slot 31 located at the rear upper surface of the main body section, this slot being enclosed and ineffective in the high speed position. The front slot 27 is preferably reduced in width as the nose flap is lowered since the shape of the pressure distribution curve is favorable to the maintenance of the flow along the forward part of the surface and a lesser flow through the slot will serve to maintain the desired pressure distribution. This is accomplished by having the forward upper surface of the main body on that part over which the flap 11 passes, of slightly greater radius of curvature than the distance of the surface to the pivot axis 13. Further the front slot may be arranged so that it is exposed and effective only when the forward flap is raised.

The function of the front flap when depressed is to cause the flow to divide substantially at the front end of the mean camber line so that there will be no peak to the pressure distribution curve at the nose. Hence there will be no adverse pressure gradient on the forward half of the wing as there is in Fig. 1 from A to G, and a relatively high suction is maintained with substantial uniformity over the major extent of the wing. The depression of the flap gives to the forward portion of the wing a high mean camber ordinate as compared to the low mean camber ordinate of the forward portion of the wing section in Fig. 1 where the forward portion of the mean camber line has a very large radius so that it is practically flat for the portion ahead of the first flap.

The effect of the nose flap on the mean camber line can be stated in terms of the local maximum ordinate $h_1$ expressed as a fraction of the local chord $C_1$ subtending the portion of the local mean camber line $om$ between the leading point $o$ and the midpoint $m$. (See Fig. 8.) The value of $h_1$ should approach and may range up to approximately one-half the value of the local chord $C_1$, the value of $h_1$ thus becoming approximately half that of $h$. The value of $h$ should be greater than 20 per cent of C to achieve high lift coefficients. Points along the wing chord are given as a fraction of the chord length aft of the leading point. Thus the 40 per cent point for instance is 40 per cent of the chord length aft of the forward point of the chord.

It will now be clear that the invention provides a wing with a high lift coefficient which will require a small amount of power because the pressure distribution is substantially uniform across the major portion of the wing chord and therefore free of peaks which would increase the adverse pressure gradient over the aft portion of the wing. Consequently the suction slot is in a region of smaller suction and the internal suction in the wing can be smaller. The favorable pressure distribution is obtained by the special distribution of the thickness over the forward portion of the wing and by the special mean camber line.

The airfoil section may be of different thicknesses and the nose of different degrees of sharpness, these characteristics being chosen according to the speed of flight for which the wing is designed.

The type of pressure distribution described in this application leads to a thinner boundary layer and hence reduces the amount of air which has to be inducted for a given maximum lift coefficient. This is important since it reduces the size of the blower and the power required for its operation.

The invention also provides a simple and effective means of converting the high lift airfoil section to a low drag section which gives highly satisfactory results for high speed flight.

While the forms of apparatus herein described constitute preferred embodiment of the invention, it is to be understood that the invention is not limited to these precise forms of apparatus, and that changes may be made therein without departing from the scope of the invention which is defined in the appended claims.

What is claimed is:

1. In combination to form a wing, a wing main body, a nose flap, a tail flap, means for adjustably supporting said flaps on said main body to form a low camber wing when in raised high speed position, means to depress said nose and tail flaps to give the wing a high lift airfoil section having a mean camber maximum ordinate greater than 20 per cent of the subtending chord length, said high lift airfoil section having its maximum thickness substantially aft of the 40 per cent point of the wing chord, the pressure distribution over the upper wing surface being maintained at a relatively high value and substantially free of intermediate adverse pressure gradient over the major portion of the chord leaving an adverse pressure gradient over the rearward portion thereof for a range of high lift coefficients which said wing requires boundary layer control to achieve such coefficients, said wing having a slot in its upper surface aft of the midpoint of the chord and in position to be effective with respect to said adverse pressure gradient, and power means to induce a flow through said slot to control the boundary layer to cause the relative wind to follow the surface of the wing and to develop said high lift coefficients.

2. In combination to form a wing, a wing main body, a nose flap, a rear flap having upper and lower walls adjustable relative to each other, means for adjustably suporting said flaps on said main body, means to depress said flaps to provide the wing with a highly cambered wing section, one adjustable wall of said rear flap adjustably overlapping the wall of said main body, means forming an articulated connection between said upper and lower walls near the trailing edge of said rear flap to provide a varying spaced relationship between its said walls to accommodate the varying thickness of said main body with varying amounts of said overlap, and means to guide said one adjustable wall along the said overlapped wall, the overlapped portion of the upper wall of said body curving downwardly toward a point on the lower wing surface substantially ahead of the trailing edges of said wing.

3. In combination to form a wing, a wing main body, a nose flap, a rear flap having upper and lower walls adjustable relative to each other, means for adjustably supporting said flaps on said main body including a pivotal support for adjustably supporting said lower wall from said wing main body, means to depress said flaps to provide the wing with a highly cambered wing section having a mean camber maximum ordinate greater than 20% of the subtending chord length, one wall of a said flap overlapping the exterior wall of said main body, means forming an articulated connection between said upper and lower walls of said rear flap to provide a controlled varying spaced relationship between its said walls to accommodate the varying thickness of said main body with varying amounts of said overlap as said lower wall rotates about its said pivot, the overlapped portion of the upper wall of said body curving downwardly toward a point on the lower ring surface substantially ahead of the trailing edge of said wing.

4. In combination to form a wing, a wing main body, a front flap, a rear flap, means for adjustably supporting said flaps on said main body in substantial alignment therewith to provide a low drag airfoil section in the raised high speed position thereof, said wing with said flaps in raised position having an airfoil section whose maximum thickness ordinate is substantially aft of the 40 per cent point of the chord, means to depress said flaps to provide the wing with a highly cambered airfoil section, said highly cambered section having a maximum thickness ordinate substantially aft of a point 40 per cent of the chord length back of the leading edge, said highly cambered wing section having a mean camber line whose maximum ordinate above the subtending chord is greater than 20 per cent of the chord length, said wing having a slot in its upper surface, said mean camber line near both its ends lying above a circle through its midpoint and its ends, the pressure distribution over the upper wing surface being maintained at a relatively high value and substantially free of intermediate adverse pressure gradient over the major portion of the chord for a range of high lift coefficients for which said wing requires boundary layer control to attain said high lift coefficients.

5. In combination to form a wing, a wing main body, a front flap, a rear flap, means for adjustably supporting said flaps on said main body in substantial alignment therewith to provide a low drag airfoil section in the raised high speed position thereof, said wing with said flaps in raised position having an airfoil section whose maximum thickness ordinate is substantially aft of the 40 per cent point of the chord, means to depress said flaps to provide the wing with a highly cambered airfoil section, said highly cambered section having a maximum thickness ordinate substantially aft of a point 40 per cent of the chord length back of the leading edge, said wing section having a mean camber line whose maximum ordinate above the subtending chord is greater than 20 per cent of the chord length, said highly combined airfoil section having its mean camber line near its forward end lying above a circle through its midpoint and its ends, said wing having the pressure distribution over the upper wing surface maintained at a relatively high value and substantially free of intermediate adverse pressure gradient over the major portion of the chord leaving an adverse pressure gradient over the rearward portion thereof for a range of lift coefficients requiring boundary layer control for attainment thereof, said airfoil having a slot in its surface leading into the wing interior and in position to be effective with respect to said adverse pressure gradient, and means to induce a flow of air therethrough to control the boundary layer on said wing surface and to cause the relative wind to continue to follow the surface of the wing.

6. In combination to form a wing, a wing main body, a front flap, a rear flap, means for adjustably supporting said flaps on said main body in substantial alignment therewith to provide a low drag airfoil section in the raised high speed position thereof, said wing with said flaps in raised position having an airfoil section whose maximum thickness ordinate is substantially aft of the 40 per cent point of the chord and whose lower contour below the said mean camber line is convex along a major portion of the chord length, means to depress said flaps to provide the wing with a highly cambered airfoil section, said highly cambered section having a maximum thickness ordinate substantially aft of a point 40 per cent of the chord length back of the leading edge, the upper surface of said highly cambered section having a smooth curvature of a substantial radius of curvature relative to the wing thickness, said wing section having a mean camber line whose maximum ordinate above the subtending chord is greater than 20 per cent of the chord length, said mean camber line near its forward end lying above a circle through its midpoint and its ends, the pressure distribution over the upper surface of said highly cambered section being substantially free of intermediate adverse pressure gradient for a range of lift coefficients for which the wing requires boundary layer control, and means to control the boundary layer on said wing to achieve said range of lift coefficients.

7. In combination to form a wing, a wing main body, a front flap, a rear flap, means to adjustably support said flaps on said main body in substantial alignment therewith to provide the wing with a low drag airfoil section in the raised high speed position thereof, means to depress said flaps to provide the wing with a highly cambered airfoil section, said highly cambered section having its maximum thickness substantially aft of the 40 per cent point of the chord and having a mean camber maximum ordinate above its subtending chord greater than 20 per cent of the chord length, said section also having a slot in its upper surface leading into the wing interior, said mean camber line ahead of the front edge of the lower surface of the rear flap having a local mean camber ordinate above its local chord greater than 10 per cent of the length of said local chord, said wing having such distribution of the wing thickness and camber that the pressure distribution over the upper wing surface is maintained at a relatively high and substantial uniform value over the major portion of the chord for range of lift coefficients requiring control of the boundary layer to achieve satisfactory coefficients, and power actuated means in communication with said slot through the wing interior to control the boundary layer on the upper surface of said wing.

8. In combination to form a wing, a wing main body, a front flap, a rear flap, means for adjustably supporting said flaps on said main body in substantial alignment therewith to provide the wing with a low drag airfoil section in the raised high speed position thereof, said airfoil section with flaps raised having a convex lower contour along the major portion of the wing chord and an upper surface contour defined by arcuate lines joined to form a concavity in the upper contour, means to depress said flaps to provide the wing with a highly cambered high lift airfoil section and with said arcuate lines forming a substantially continuous upper convex surface, said high lift section having its maximum thickness substantially aft of the 40 per cent point of the chord, said wing having the pressure distribution over the upper wing surface maintained at a relatively high value and substantially free of intermediate adverse pressure gradient over the major portion of the chord, said airfoil section having a slot in said concavity leading into the wing interior, and means to induce a flow through said slot.

9. In combination to form a wing, a wing main body, a front flap, a rear flap, means for adjustably supporting said flaps on said main body in substantial alignment therewith to provide the wing with a low drag airfoil section in the raised high speed position thereof, said airfoil section with flaps raised having a convex lower contour along the major portion of the wing chord and an upper surface contour defined by arcuate lines joined to form concavities in the upper contour, means to depress said flaps to provide the wing with a highly cambered high lift airfoil section and with said arcuate lines forming a substantially continuous upper convex surface, said high lift section having its maximum thickness substantially aft of the 40 per cent point of the chord, said wing having such distribution of the wing thickness that the pressure distribution over the upper wing surface is maintained at a relatively high value and substantially free of intermediate adverse pressure gradient over the major portion of the chord, said airfoil section having slots in its upper surfaces at the bottoms of said concavities, and means to induce a flow through said slots.

10. In combination to form a wing, a wing main body, a front flap, a rear flap, means for adjustably supporting said flaps on said main body in substantial alignment therewith to provide the wing with a low drag airfoil section in the raised high speed position thereof, said airfoil section with flaps raised having a convex lower contour along the major portion of the wing chord and an upper surface contour defined by arcuate lines joined to form concavities in the upper contour, means to depress said flaps to provide the wing with a highly cambered high lift airfoil section, said high lift section having its maximum thickness substantially aft of the 40 per cent point of the chord, said high lift section having the pressure distribution over the upper wing surface maintained at a relatively high and substantially uniform value over the major portion of the chord leaving an adverse pressure gradient over the rearward portion thereof, for range of lift coefficients requiring boundary layer control for attainment thereof, said airfoil section having slots in its upper surfaces at the bottoms of said concavities, at least one of said slots being located in position to be effective with respect to said adverse pressure gradient, means for supporting said front flap providing for reduction in the width of said slot as said flap is lowered, and means to induce a flow through said slots to cause the relative wind to continue to follow the surface of the wing.

11. In combination, a wing, means deforming the aft end of said wing to provide a mean camber maximum ordinate of such magnitude that the relative wind fails to follow said upper aft surface and fails to sustain an increasing lift coefficient with increasing angle of attack, means defining a slot in the upper aft end surface of said wing, power actuated means within said wing in communication with said slot for inducing a flow therethrough and causing the relative wind to follow said aft surface with resulting increase of lift and formation of pressure distribution curve over the forward portion of said wing having a substantial suction peak near the nose of said wing, and means for substantially reducing said suction peak to reduce the power consumption of said power actuated means comprising means to deform the nose of said wing to produce a substantially increased arching of the forward portion of said mean camber line, said wing with said deformed nose and aft portions having a mean camber line maximum ordinate above its subtending chord greater than 20 per cent of said chord length.

12. In combination to form a wing, a wing main body and a flap adjustably supported on said body, said body having a curved upper end surface extending chordwise into the wing interior in a regular curve of radius substantially greater than the thickness of said body at the junction of said flap and main body and of substantial curvature along its exposable portion, means to adjust said flap to a lowered position at a substantial angle to said body causing the upper wall of said flap to slide along said curved upper surface of said main body, said flap having its upper and lower walls variably connected at their outward end to accommodate a movement of one wall relative to the other, and means guiding said upper wall in sliding relation along said end surface to expose said curved exposable surface and form therewith a contour of easy curvature over said combined flap and end surfaces.

13. In combination to form a wing, a wing main body, a front flap, a rear flap having a boundary layer control slot in its surface, means for adjustably supporting said flaps on said main body in substantial alignment therewith to provide the wing with a low drag airfoil section in the raised high speed position thereof, said airfoil section with flaps raised having a convex lower contour along the major portion of the wing chord, said main body having at its forward end an opening into said body interior covered by the flap surface of said front flap in the raised position thereof, means to depress said flaps to provide the wing with a highly cambered high lift airfoil section, said front flap in its lowered position uncovering said opening, and power actuated means in communication with said opening through said wing interior to induce a flow through said slots to control the boundary layer.

14. In combination to form a wing, a wing main body, a front flap, a rear flap, means for adjustably supporting said flaps on said main body in substantial alignment therewith to provide the wing with a low drag high speed airfoil section in the raised high speed position of said flaps, said airfoil section with raised flaps having a smoothly changing convex lower contour along the major portion of the wing chord and having its maximum thickness ordinate substantially aft of the 40 per cent point of the chord, means to depress said flaps to provide the wing with a highly cambered airfoil section, said wing with said flaps depressed having a slot in the upper surface adjacent said front flap, and power actuated means in communication with said slots through the wing interior to induce a flow of fluid through said slots and to provide positive boundary layer control, said airfoil section with flaps depressed providing a pressure distribution over the upper wing surface of relatively high value and substantially free of intermediate adverse pressure gradients over the major portion of the wing chord for a range of lift coefficients requiring said positive boundary layer control for the attainment thereof.

15. In combination to form a wing, a wing main body, a front flap, a rear flap, means for adjustably supporting said flaps on said main body in substantial alignment therewith to provide the wing with a low drag high speed airfoil section in the raised high speed position of said flaps, said airfoil section with raised flaps having a smoothly changing convex lower contour along the major portion of the wing chord and having its maximum thickness ordinate substantially aft of the 40 per cent point of the chord, means to depress said flaps to provide the wing with a highly cambered airfoil section, said wing with said flaps depressed having slots in the upper surface thereof, the lowering of at least one of said flaps uncovering one of said slots in said upper surface, and power actuated means in communication with said slots through the wing interior to induce a flow of fluid through said slots to establish boundary layer control on said upper surface.

EDWARD A. STALKER.

REFERENCES CITED

The following references are of record in the file of this patent:

UNITED STATES PATENTS

| Number | Name | Date |
|---|---|---|
| 1,752,378 | Gobble | Apr. 1, 1930 |
| 1,856,219 | Lange | May 3, 1932 |
| 2,142,123 | Fahrney | Jan. 3, 1939 |
| 1,540,105 | Cook | June 2, 1925 |
| 1,567,531 | Magni | Dec. 29, 1925 |
| 1,720,667 | Dare | July 16, 1929 |
| 1,433,030 | Page | Oct. 24, 1922 |

FOREIGN PATENTS

| Number | Country | Date |
|---|---|---|
| 525,666 | Great Britain | Sept. 2, 1940 |
| 209,435 | Great Britain | Nov. 27, 1924 |
| 589,059 | Germany | Oct. 1935 |
| 222,845 | Great Britain | May 7, 1925 |
| 705,155 | France | Mar. 3, 1931 |

OTHER REFERENCES

"Airplane Design," by Edward P. Warner, McGraw-Hill, New York, pages 71 and 75. (Copy in Div. 22.)

N. A. C. A. Technical Memorandums, No. 974. Boundary Layer Removal By Suction, by O. Schrank. (Copy in Div. 22.)